United States Patent [19]
Reinhardt et al.

[11] Patent Number: 5,578,362
[45] Date of Patent: Nov. 26, 1996

[54] POLYMERIC POLISHING PAD CONTAINING HOLLOW POLYMERIC MICROELEMENTS

[75] Inventors: Heinz F. Reinhardt, Chadds Ford, Pa.;
John V. H. Roberts, Newark, Del.;
Harry G. McClain, Middletown, Del.;
William D. Budinger, Newark, Del.;
Elmer W. Jensen, New Castle, Del.

[73] Assignee: Rodel, Inc., Newark, Del.

[21] Appl. No.: 274,134

[22] Filed: Jul. 12, 1994

Related U.S. Application Data

[63] Continuation of Ser. No. 932,161, Aug. 19, 1992, abandoned.

[51] Int. Cl.$^6$ .............................. B24B 37/02; B24B 7/22
[52] U.S. Cl. .................. 428/147; 428/141; 428/143;
428/323; 428/327; 428/402; 428/423.1;
428/425.1; 428/313.5; 428/305.5; 428/332;
428/338; 428/220; 428/152; 428/163; 428/167;
428/156; 428/168; 428/408.8; 51/296; 51/298;
51/302; 51/303; 437/225; 437/228; 437/946;
437/974; 451/527; 451/530
[58] Field of Search .................... 428/141, 143,
428/147, 323, 327, 402, 423.1, 425.1, 313.5,
305.5, 332, 338, 220, 152, 163, 167, 156,
168, 908.8; 51/296, 298, 302, 303; 437/225,
228, 946, 974; 451/527, 530

[56] References Cited

U.S. PATENT DOCUMENTS

| | | | |
|---|---|---|---|
| 1,986,849 | 1/1935 | Pohl et al. | 51/296 |
| 2,806,772 | 9/1957 | Robie | 51/296 |
| 3,377,151 | 4/1968 | Lanham | 51/296 |
| 3,928,949 | 12/1975 | Wagner | 51/296 |
| 4,089,120 | 5/1978 | Kozischek | 34/12 |
| 4,111,667 | 9/1978 | Adams | 51/295 |
| 4,147,766 | 4/1979 | Kozischek | 424/14 |
| 4,270,316 | 6/1981 | Kramer et al. | 51/283 R |
| 4,430,155 | 2/1984 | Kozischek et al. | 159/4 S |
| 4,512,113 | 4/1985 | Budinger | 51/296 |
| 4,543,106 | 9/1985 | Parekh | 51/295 |
| 4,728,552 | 3/1988 | Jensen, Jr. | 428/91 |
| 4,799,939 | 1/1989 | Bloecher et al. | 51/293 |
| 4,927,432 | 5/1990 | Budinger et al. | 428/290 |
| 4,954,140 | 9/1990 | Kawashima et al. | 51/296 |
| 4,954,141 | 9/1990 | Takiyama et al. | 51/296 |
| 5,020,283 | 6/1991 | Tuttle | 51/209 DL |
| 5,081,051 | 1/1992 | Mattingly et al. | 437/228 |
| 5,096,854 | 3/1992 | Saito et al. | 437/225 |
| 5,177,908 | 1/1993 | Tuttle | 51/283 R |
| 5,197,999 | 3/1993 | Thomas | 51/298 |
| 5,216,843 | 6/1993 | Breivogel et al. | 51/131.1 |
| 5,234,867 | 8/1993 | Schultz et al. | 437/225 |
| 5,287,663 | 2/1994 | Pierce et al. | 51/401 |
| 5,329,734 | 7/1994 | Yu | 51/283 R |

FOREIGN PATENT DOCUMENTS

| | | |
|---|---|---|
| 0103718 | 3/1984 | European Pat. Off. . |
| 0447885 | 9/1991 | European Pat. Off. . |
| 58-192757 | 11/1983 | Japan . |
| 1071661 | 3/1989 | Japan . |
| 2232173 | 9/1990 | Japan . |
| 1575867 | 10/1980 | United Kingdom . |

*Primary Examiner*—William P. Watkins, III
*Attorney, Agent, or Firm*—Panitch Schwarze Jacobs & Nadel, P.C.

[57] ABSTRACT

The present invention relates to an article of manufacture or polishing pad for altering a surface of a workpiece, such as polishing or planarizing a semiconductor device. The article includes a polymeric matrix impregnated with a plurality of polymeric microelements, each polymeric microelement having a void space therein. The article has a work surface and a subsurface proximate to the work surface. When the article is in contact with a working environment, polymeric microelements at the work surface of the article are less rigid than polymeric elements embedded in the subsurface. As the work surface of the article is abraded during use, the work surface of the pad may be continuously regenerated. In alternative preferred embodiments, the work surface may further include a minitexture and/or a macrotexture. Preferably, the minitexture is formed by fractal patterning at least a portion of the work surface. The present invention also includes methods for decreasing the effective rigidity of polymeric microelements at the work surface of the article, regenerating the work surface of the article and planarizing a surface of a semiconductor device utilizing the article.

21 Claims, 6 Drawing Sheets

POLYMERIC POLISHING PAD CONTAINING HOLLOW POLYMERIC MICROELEMENTS

CROSS-REFERENCE TO RELATED APPLICATIONS

This is a continuation of U.S. patent application Ser. No. 07/932,161, filed Aug. 19, 1992, now abandoned.

FIELD OF THE INVENTION

The invention relates to a polymeric substrate impregnated with polymeric microelements and methods of making and using the same and, more particularly, to an article of manufacture for use in polishing materials, such as semiconductor devices.

BACKGROUND OF THE INVENTION

Conventional polymeric substrates or polishing pads used for polishing, planarizing and other operations for which the present article is useful may be subjected to a variety of operating conditions which influence the selection of the substrate material. For example, variations in the nature of the workpiece being polished, polishing speed and pressure, elevated temperatures generated during the polishing operation, and the nature of any polishing slurry used in the operation may influence the choice of substrates.

Conventional polymeric polishing pads often vary in quality due to imprecise control of polymerization and blending processes and cutting and shaping of the final pad product. Therefore, the polishing characteristics imparted to a workpiece being polished, such as surface quality, stock removal rate and planarization rate, typically vary greatly between pad batches.

Conventional polishing pads are generally formed from multilayer laminations or stratified substrates having non-uniform physical properties throughout the thickness of the pad. An example of a typical stratified pad widely used for polishing semiconductor devices is the Politex Supreme pad, which is commercially available from Rodel Incorporated, of Newark, Del. A typical Politex Supreme pad is composed of several layers, including a firm but resilient, 1 mm to 2 mm thick, porous bottom layer comprised of a polyester felt and polyurethane binder. A spongy and resilient microporous urethane layer of about 0.05 mm to 0.3 mm thickness is laminated onto the bottom layer. The top layer is comprised of vertical urethane structures having vertical, tapered pores, the taper of the pores narrowing toward the top of the pad. The top layer is very soft, porous and elastic. In a typical polishing operation, the top layer of such a stratified pad wears rapidly. As the top layer wears and subsequent layers are exposed, the polishing properties of the pad vary, resulting in non-uniform polishing rates and producing inconsistent polishing characteristics on the surface of the workpiece.

Conventional polishing pads typically have textured surfaces. The "microtexture" of a pad is the intrinsic microscopic bulk texture of the pad after manufacture. Some of the factors which influence the static morphology or microscopic bulk texture of a conventional pad are the nature or texture of the work surface, such as waves, holes, creases, ridges, slits, depressions, protrusions and gaps, and the size, shape, and distribution, frequency or spacing of individual features or artifacts. In typical polishing pads, the microtexture of the pad is largely random and is the result of factors intrinsic to the manufacturing process. Because of the large number of variables in the manufacturing process, few attempts have been made to Control variables such as pore size, shape and distribution. Other characteristics which may affect the pad texture are hardness, resilience, thickness, permeability, and resistivity, to name a few.

"Minitexturized" pads have intermediately sized textured artifacts on the pad, which may be produced by use of lasers or the incorporation of air or gas within the pad material.

"Macrotextures", or larger size textured artifacts, may be imposed on the work surface of a pad by embossing, skiving, perforating and/or machining, for example. In conventional polishing pads, the spacing and/or size of individual macrotexture artifacts or features is generally greater than 5 mm. The spacing and size of these artifacts are typically very regular and repetitive.

Conventional polishing pads may include various solid particulates, such as cerium oxide, titanium oxide, aluminum oxide, barium carbonate, glass dust and fibers, diatomaceous earth, rouge, calcium carbonate, diamond, and carbon, for example. Typically, mechanical mixing and distribution of such particulates has been poorly controlled.

It would be desirable to have a substrate for polishing and other operations in which the particle distribution of additives may be optimized on a molecular scale. It is also desirable to have a polymeric substrate in which the surface of the substrate regenerates itself and does not vary appreciably as the surface is contacted with a workpiece. A polishing substrate which has a series of hardness variations on a micro scale and which can be texturized on a mini or macro scale to help remove dross (effluent, grindings, etc.) during polishing operations would also be advantageous.

SUMMARY OF THE INVENTION

Briefly, one aspect of the present invention is an article of manufacture for altering a surface of a workpiece. The article comprises a polymeric matrix impregnated with a plurality of polymeric microelements. Each polymeric microelement has a void space therein. The article has a work surface and a subsurface proximate to the work surface. When the article is in contact with a working environment, the polymeric microelements at the work surface of the article are less rigid than polymeric microelements embedded in the subsurface.

A further aspect of the present invention is an article of manufacture for altering a surface of a workpiece. The article comprises a polymeric matrix impregnated with a plurality of polymeric microelements. Each polymeric microelement has a void space therein. The article has a texturized work surface and a subsurface proximate to the work surface. When the article is in contact with the working environment, the polymeric microelements at the work surface of the article are less rigid than polymeric microelements embedded in the subsurface.

Another aspect of the present invention is a semiconductor device planarized by contact with an article. The article comprises a polymeric matrix impregnated with a plurality of polymeric microelements. Each polymeric microelement has a void space therein. The article has a work surface and a subsurface proximate to the work surface. When the article is in contact with the working environment, the polymeric microelements at the work surface of the article are less rigid than the polymeric microelements embedded in the subsurface. The semiconductor device includes a surface planarized by contact with the work surface of the article.

Another aspect of the present invention is a method for regenerating a work surface of an article in contact with a working environment. The article is for altering a surface of a workpiece. The method comprises the steps of: providing an article comprising a polymeric matrix; impregnating the polymeric matrix with a plurality of polymeric microelements, each polymeric microelement having a void space therein, wherein the article has a work surface and a subsurface proximate the work surface; and opening at least a portion of shells of a portion of polymeric microelements located proximate to the work surface, such that the open polymeric microelements are less rigid than polymeric microelements embedded in the subsurface.

Yet another aspect of the present invention is a method for regenerating a work surface of an article. The article is for altering the surface of a workpiece. The method comprises the steps of: providing an article comprising a polymeric matrix; impregnating the polymeric matrix with a plurality of polymeric microelements, each polymeric microelement having a void space therein, wherein the article has a work surface and a subsurface proximate to the work surface; contacting said article with a working environment; and chemically altering at least a portion of shells of a portion of polymeric microelements located proximate the work surface, such that the chemically altered polymeric microelements are less rigid than polymeric microelements embedded in the subsurface.

Another aspect of the present invention is a method for decreasing the effective rigidity of polymeric microelements located at a portion of a work surface of an article in contact with a working environment. The method comprises the steps of: providing an article comprising a polymeric matrix; impregnating the polymeric matrix with a plurality of polymeric microelements, each polymeric microelement having a void space therein, wherein the article has a work surface and a subsurface proximate the work surface; and texturizing the portion of the work surface including said polymeric microelements.

A further aspect of the present invention is a method of planarizing a surface of a semiconductor device utilizing an article. The method comprises the steps of: providing an article comprising a polymeric matrix; impregnating the polymeric matrix with a plurality of polymeric microelements, each polymeric microelement having a void space therein, wherein the article has a work surface and a subsurface proximate to the work surface; contacting the article with a working environment such that polymeric microelements at the work surface of the article are less rigid than polymeric microelements located in the subsurface; and contacting the surface of the semiconductor device with a work surface of the article.

BRIEF DESCRIPTION OF THE DRAWINGS

The foregoing summary, as well as the following detailed description of the preferred embodiments, will be better understood when read in conjunction with the appended drawings. For the purpose of illustrating the invention, there are shown in the drawings embodiments which are presently preferred, it being understood, however, that the invention is not limited to the specific methods and instrumentalities disclosed. In the drawings.

DESCRIPTION OF THE PREFERRED EMBODIMENTS

Figure 1:
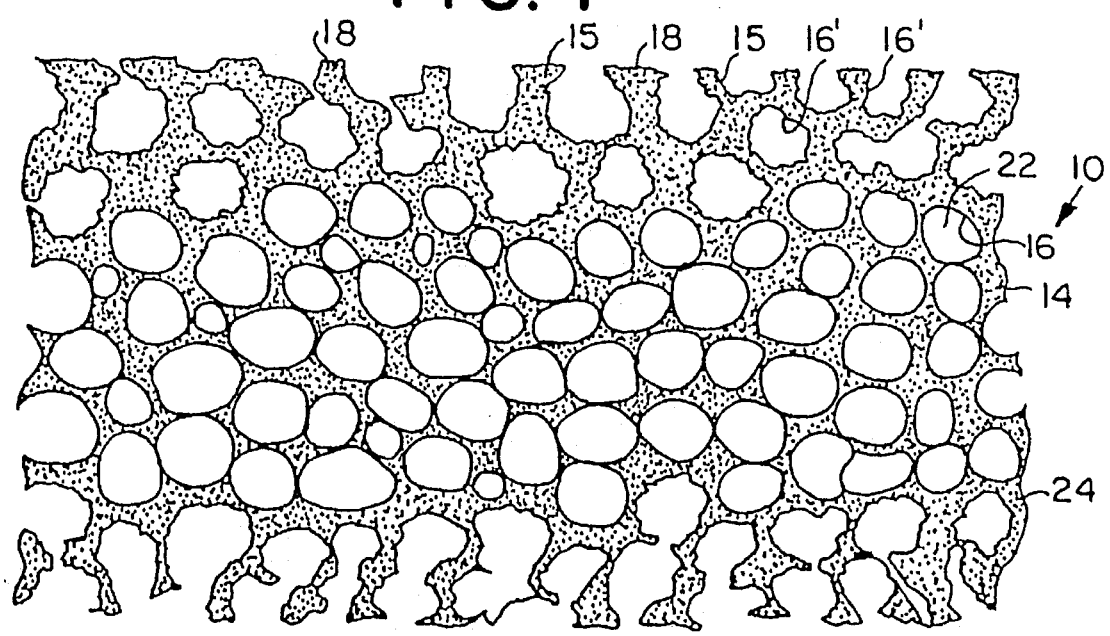
FIG. 1 is a schematic cross-sectional diagram of an article, in accordance with the present invention.

Referring to the drawings, wherein like numerals indicate like elements throughout, there is shown in FIGS. 1–3, 5–9 and 11 embodiments of an article of manufacture, generally designated 10, 110, 210, 310 and 410, in accordance with the present invention.

Figure 5:
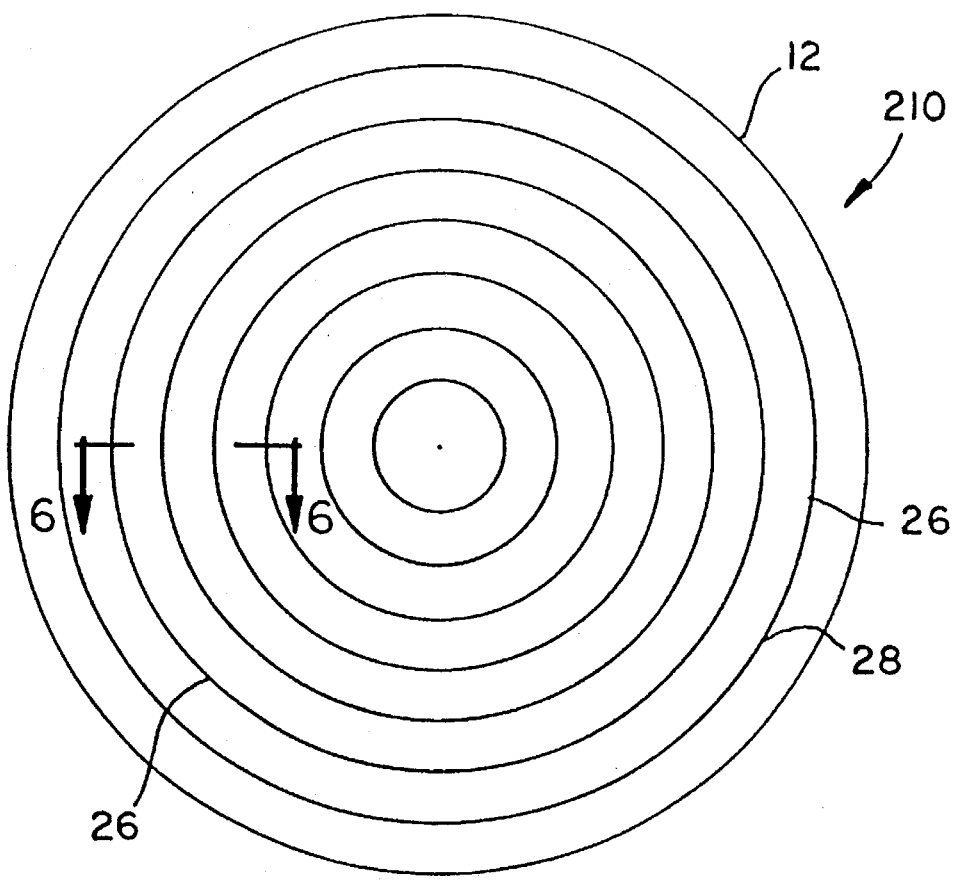
FIG. 5 is a schematic diagram of an alternative embodiment of a minitexturized pad according to the present invention.
Figure 7:
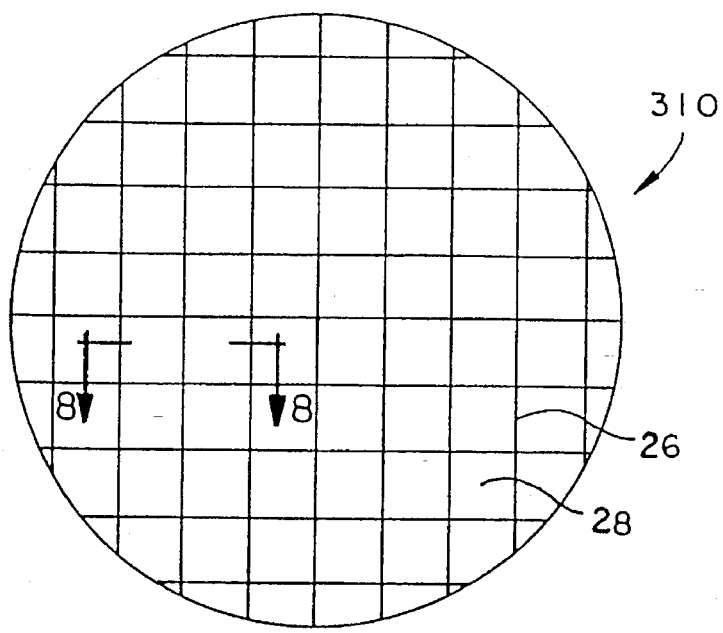
FIG. 7 is a schematic diagram of an alternative embodiment of a macrotexturized pad according to the present invention.

Preferably, the article 10 is a generally circular sheet or polishing pad 12, best shown in FIGS. 5 and 7, although one of ordinary skill in the art would understand that the pad 12, may, for example, be generally square, rectangular or of any suitable shape, as desired.

The article 10 et seq. of the present invention may be used as a polishing pad either by itself or as a substrate in a polishing operation in which a polishing slurry is used to provide a desired surface finish for semiconductor devices, silicon devices, crystals, glass, ceramics, polymeric plastic material, metal, stone or other surfaces. Polishing pads 12 made with the article 10 et seq. of the present invention may be used with lubricants, coolants and various abrasive slurries, all well known to those skilled in the art and readily available commercially. Typical components of such slurries include liquid media, such as water or oil; abrasive agents, such as aluminum oxide, silicon carbide, silicon dioxide, cerium oxide and garnet; bases; acids; salts; surfactants, and/or other agents depending upon the nature of the workpiece. The working environment of the article comprises the environment surrounding the article when in use, including the substrate to be polished and the lubricants, coolants and various abrasive slurries described above.

The article 10 et seq. is useful for altering a surface (not shown) of a workpiece (also not shown) by a polishing operation, such as lapping, planarizing, grinding or shaped, too name a few. The workpieces to be polished preferably comprise friable substances, such as quartz, silicon, glass, electronic and optical substrates, and high density multicomponent electronic devices, for example. The workpiece may be a semiconductor device (not shown) having multiple layers of polysilicone, thermal oxides, and metallic materials, each layer of which may be planarized before a subsequent layer is deposited thereon.

As best shown in FIG. 1, the article 10 comprises a polymeric matrix 14 which is preferably impervious to aqueous fluid slurries typically used in polishing and planarization operations. The polymeric matrix 14 may be formed from urethanes, melamines, polyesters, polysulfones, polyvinyl acetates, fluorinated hydrocarbons, and the like, and mixtures, copolymers and grafts thereof. One of ordinary skill in the art would understand that any other polymer having sufficient toughness and rigidity to resist abrasive wear during polishing operations may be used, in keeping with the spirit and scope of the present invention. As presently preferred, the polymeric matrix 14 comprises a urethane polymer. The urethane polymer is preferably formed from a polyether-based liquid urethane, such as the ADIPRENE™ line of products which are commercially available from Uniroyal Chemical Co., Inc. of Middlebury, Conn. The preferred liquid urethane contains about 9 to about 9.3% by weight free isocyanate. Other isocyanate bearing products and prepolymers may also be used in keeping with the spirit and scope of the present invention.

The liquid urethane is preferably one which reacts with a polyfunctional amine, diamine, triamine or polyfunctional hydroxyl compound or mixed functionality compounds such as hydroxyl/amines dwelling in urethane/urea crosslinked networks to permit the formation of urea links and a cured/ crosslinked polymer network. As presently preferred, the liquid urethane is reacted with 4,4'-methylene-bis [2-chloroaniline] ("MOCA"), which is commercially available as the product CURENE® 442, from Anderson Development Co. of Adrian, Mich.

As best shown in FIG. 1, the polymer matrix 14 is impregnated with a plurality of polymeric microelements 16. Preferably, at least a portion of the polymeric microelements are generally flexible. Suitable polymeric microelements include inorganic salts, sugars and water-soluble gums and resins. Examples of such polymeric microelements include polyvinyl alcohols, pectin, polyvinyl pyrrolidone, hydroxyethylcellulose, methylcellulose, hydropropylmethylcellulose, carboxymethylcellulose, hydroxypropylcellulose, polyacrylic acids, polyacrylamides, polyethylene glycols, polyhydroxyetheracrylites, starches, maleic acid copolymers, polyethylene oxide, polyurethanes and combinations thereof. The microelements 16 may be chemically modified to change the solubility, swelling and other properties by branching, blocking, and crosslinking, for example.

As presently preferred, each of the polymeric microelements 16 has a mean diameter which is less than about 150 μm, and more preferably a mean diameter of about 10 μm. One of ordinary skill in the art would understand that the mean diameter of the microelements may be varied and that microelements 16 of the same or different sizes or mixtures of different microelements 16 may be impregnated in the polymeric matrix 14, as desired.

As presently preferred, each of the polymeric microelements 16 are spaced apart about 1 μm to about 100 μm. Preferably, the polymeric microelements 16 are substantially uniformly distributed throughout the polymeric matrix 14 by high shear mixing. The resulting composite mixture is transferred to a conventional mold before the viscosity of the reacted urethane polymer becomes too great to permit sufficient blending of the microelements with the polymer mixture. One of ordinary skill in the art would understand that the low viscosity window may vary at different temperatures for different thermosetting plastics and curing agents. The resulting mixture is gelled in the mold for about 15 minutes. The gelling time may vary based upon factors such as temperature and selection of the polymer matrix and microelements. The composite is then cured at about 200°–225° F. for about 4–6 hours and cooled to room temperature (about 70° F.). The curing temperature may vary depending upon the polymer matrix and type of microelements used, among other factors.

The resulting article 10 is removed from the mold and cut, sliced, etc. to the desired thickness and shaped to form polishing pads 12. One of ordinary skill in the art would understand that the molded composite may be sliced, cut or otherwise machined to any thickness or shape as desired, in accordance with the present invention.

Depending upon the intended application or operation, at least a portion of the polymeric microelements 16 may be generally spherical in shape, as shown in FIG. 1. Preferably such microspheres are hollow, each microsphere having a shell with a thickness of about 0.1 μm.

Figure 3:
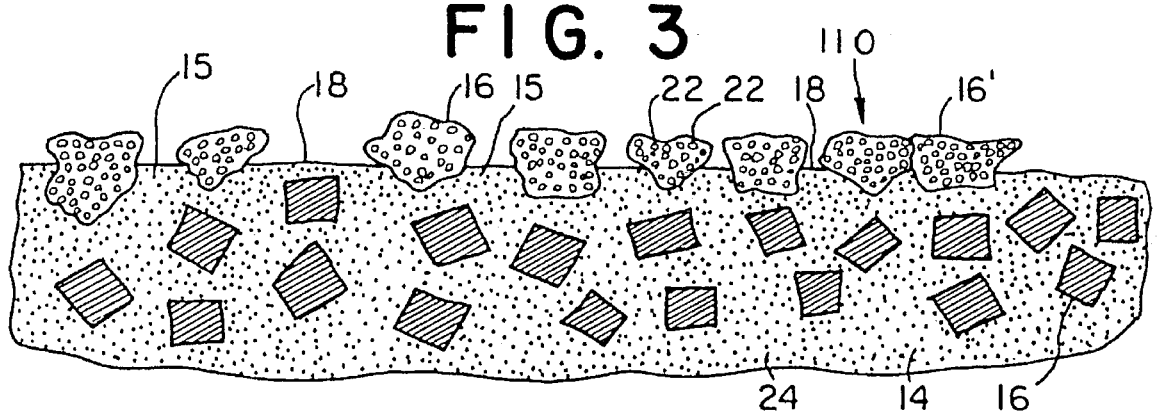
FIG. 3 is a schematic cross-sectional diagram of an alternative embodiment of an article according to the present invention, in which microelements at the work surface of the article have swelled when in contact with the working environment.

As best shown in FIG. 1, each polymeric microelement 16 has a void space 22 therein. At least some of the polymeric microelements 16 preferably have a plurality of void spaces 22 therein, which define the hollow volume of the microelement, as best shown in FIG. 3. It is preferred (but not required) that each void space 22 generally contains a gas at a pressure greater than atmospheric pressure to help maintain the structural integrity of the microelements 16', 16, respectively, both at the work surface 18 and subsurface 24 of the polymeric matrix 14.

Figure 11:
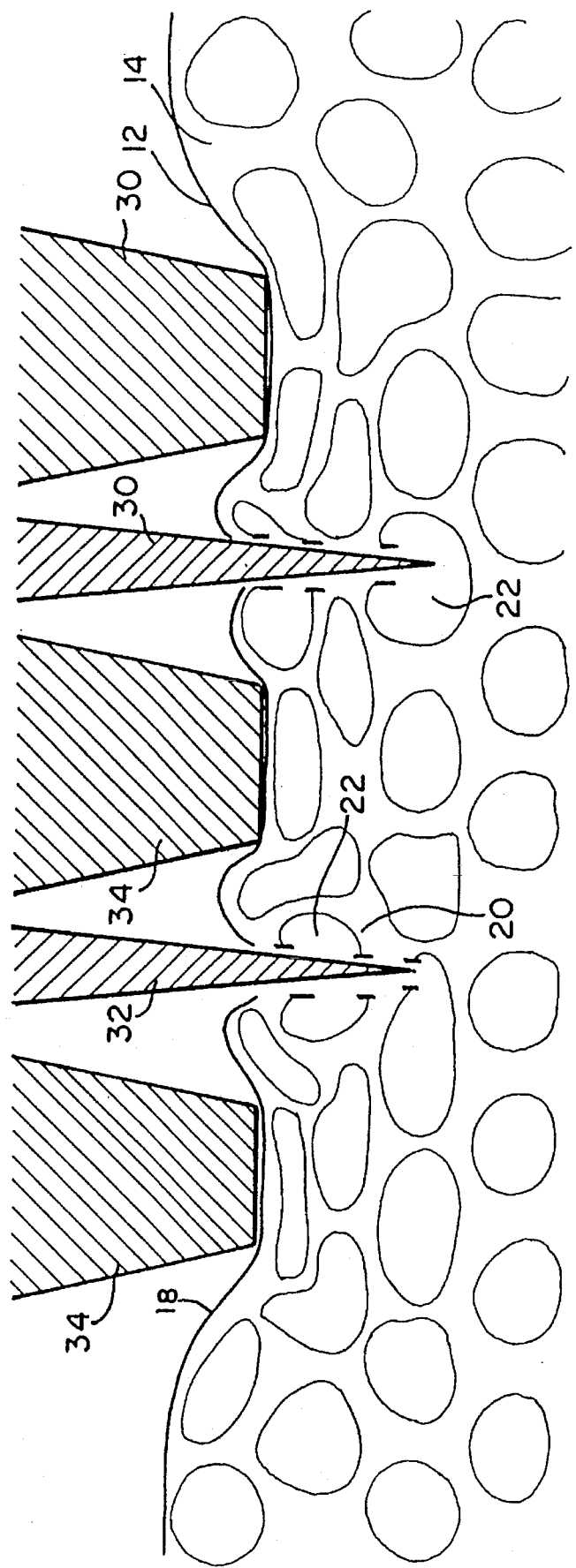
FIG. 11 is a schematic diagram of a device for pommelgating and puncturing a portion of shells of microelements at a work surface of an article according to the present invention.

The polymeric microelements may have permeable or puncturable shells 20, best shown in FIG. 11, so that the void spaces 22 within the microelements 16' may be rendered open to the working environment.

As best shown in FIG. 1, in a preferred embodiment of the present invention, at least a portion of the polymeric microelements 16' located at the work surface 18 soften upon contact with the working environment (not shown) or polishing slurry. For example, water soluble cellulose ethers such as methylcellulose will dissolve upon contact with water in an aqueous polishing slurry.

As best shown in FIG. 1, in another preferred embodiment, at least a portion of the polymeric microelements 16' located at the work surface 18 swell upon contact with the working environment. For example, longer chain cellulose ethers may swell upon contact with water in an aqueous polishing slurry.

Figure 2:
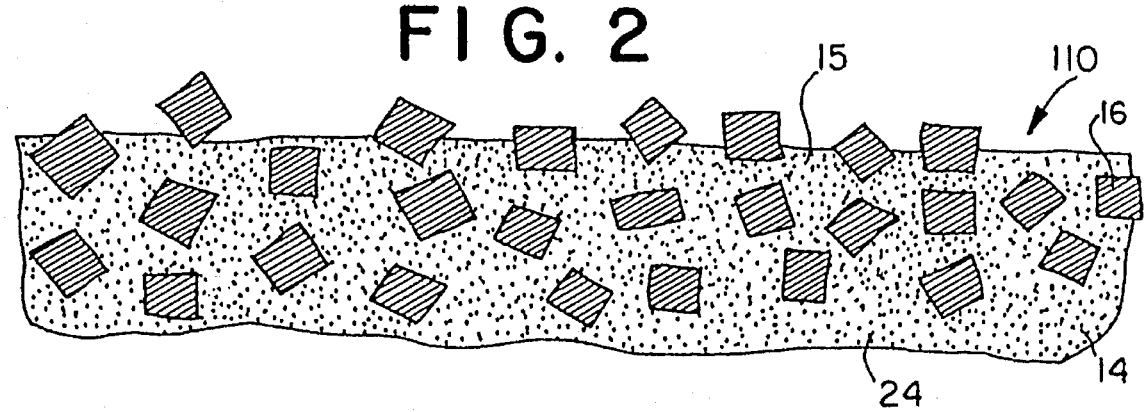
FIG. 2 is a schematic cross-sectional diagram of an alternative embodiment of an article according to the present invention.

The article 10 has a work surface 18 and a subsurface 24 proximate to the work surface 18, as best shown in FIGS. 1–3. Preferably, the work surface 18 is about 5 um to about 60 um thick. The thickness of the article 10 is preferably between about 300 μm and about 400 μm in a direction generally perpendicular to a major plane (not shown) of the work surface 18.

An advantage of the present invention is that polymeric microelements 16' at the work surface 18 of the article 10 are less rigid than the polymeric microelements 16 embedded in the subsurface 24 when the article 10 is in contact with the working environment. Also, the less rigid polymeric microelements 16' provide less support for the portion 15 of the polymeric matrix 14 which surrounds the less rigid microelements, thereby reducing the effective rigidity of that surrounding portion 15 of the polymeric matrix. Therefore, at least two levels of hardness are created in the article 10, the work surface 18 being generally softer than the subsurface 24.

Another advantage of the present invention is that as the work surface 18 of the article wears, such as by contact with the surface of a workpiece or the working environment, the subsurface 24 immediately adjacent to the work surface 18 becomes the new work surface and the two levels of hardness are regenerated continuously, which permits more even and consistent polishing of the workpiece and more even wear of the pad 12.

Different aspects of the present invention will now be described and explained further by reference to the following specific, illustrative, non-limiting examples.

EXAMPLE 1

A polymeric matrix was prepared by mixing 2997 grams of Uniroyal Adiprene L-325 polyether-based liquid urethane with 768 grams of Curene® 442 (4,4'-methylene-bis [2-chloroaniline] ("MOCA") at about 150° F. At this temperature, the urethane/polyfunctional amine mixture has a pot life of about 2.5 minutes (the "low viscosity window").

During this low viscosity window, 69 grams of EXPANCEL™ 551 DE hollow elastic polymeric microspheres were blended with the polymer mixture at 3450 rpm using Rodel Incorporated high shear blending and mixing equipment to generally evenly distribute the microspheres in the polymer mixture. The mixture was transferred to a conventional mold during the low viscosity window and permitted to gel for about 15 minutes.

The mold was next placed in a curing oven, such as is commercially available from Koch Oven Corporation. The mixture was cured in the oven for about 5 hours at about 200° F. The power to the oven was then shut off and the mixture permitted to cool in the oven for about 4–6 hours until the temperature of the molded article 10 was about 70° F. (room temperature). The molded article was then cut to form polishing pads. The mean distance between the microspheres in the resulting polishing pad 12 is believed to be between about 75 and about 300 μm.

Figure 4:
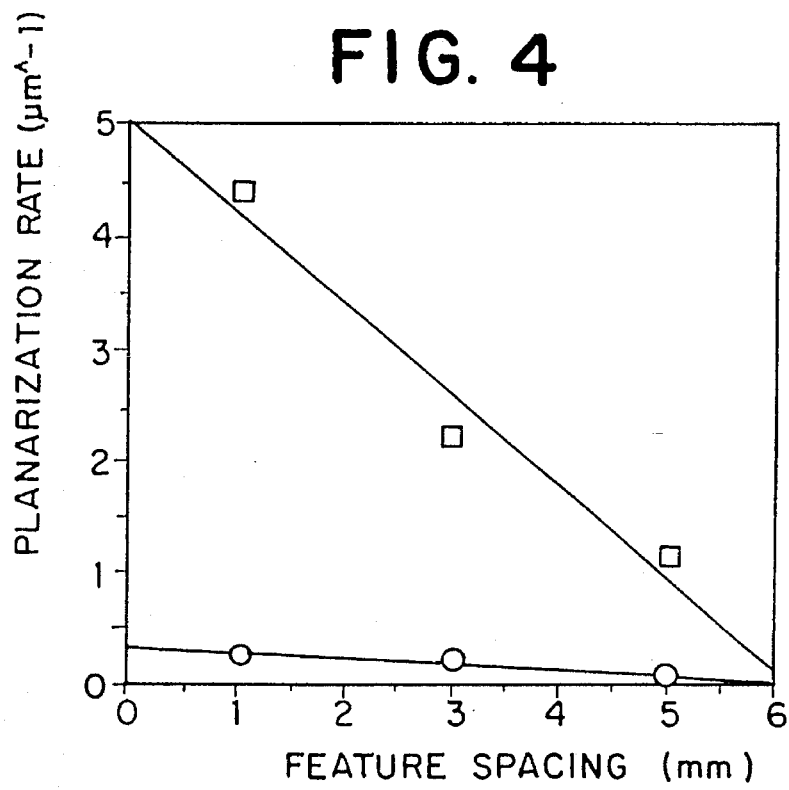
FIG. 4 is a graph of planarization rate as a function of distance between features on the surface of a typical semiconductor device.

As shown in FIG. 4, the planarization rate ($\mu m^{-1}$) is more than four times greater for a 20 mil thick urethane pad having EXPANCEL™ microspheres embedded therein (as designated by the squares) than a similar urethane pad without microspheres (as designated by the circles) when the pads were used to planarize a typical semiconductor device having features or chips spaced about 1 mm apart. In other words, FIG. 4 shows that a device may be planarized about four times faster by using a urethane pad having microelements embedded therein than without microelements, according to the present invention.

Figure 10:
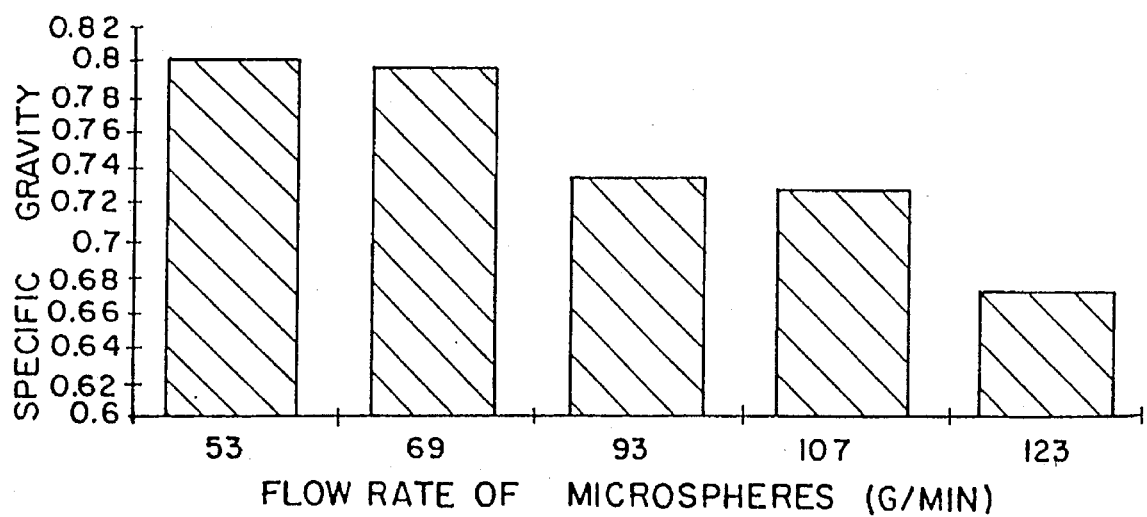
FIG. 10 is a bar graph showing specific gravity of an article according to the present invention as a function of the flow rate of microspheres.

As shown in FIG. 10, the specific gravity of the molded article decreases as the flow rate of microspheres is increased. Generally, it is preferred that the specific gravity of the pad be about 0.75 to about 0.8, which corresponds to an EXPANCEL™ microsphere flow rate of about 53 grams/minute.

EXAMPLE 2

A polymeric matrix was prepared by mixing 2997 grams of Uniroyal ADIPENE™ L-325 urethane with 768 grams of CURENE® 442 MOCA and high shear mixing the urethane polymer with 87 grams of powdered partially acetylated polyvinyl alcohol, which is commercially available from Air Products and Chemicals Corporation of Allentown, Pa. During the low viscosity window (2.5 mins.), the mixture was poured into a mold, gelled, cured in an oven for about six hours at about 225° F. and cooled to room temperature in a similar manner to that of the article of Example 1. It is believed that essentially no reaction of the OH groups of the polyvinyl alcohol and the isocyanate group of the liquid urethane occurs because of the much faster reaction of the urethane with the MOCA amino groups.

EXAMPLE 3

A polymeric matrix was prepared in a manner similar to that of Example 1 by mixing 3625 grams of ADIPRENE™ L-213 urethane to 930 grams CURENE® 442 MOCA. During the low viscosity window (about 2.5 mins.), 58 grams of pectin powder, which is commercially available from Freeman Industries, Inc. of Tuckahoe, N.Y., was high shear mixed with the urethane polymer to evenly distribute the pectin powder throughout the urethane mixture. During the low viscosity window (2.5 mins.), the resulting urethane/pectin mixture was poured into a mold, gelled and cured for about six hours at 225° F. and cooled and processed in a manner similar to that set forth in Example 1.

EXAMPLE 4

A polymer matrix was prepared by mixing 2997 grams of ADIPRENE™ L-325 urethane with 65 grams of polyvinyl pyrrolidone powder, which is commercially available from BASF Chemicals Corp. of Parsippany, N.J. or GAF Chemicals Corp. of Wayne, N.J., for about 30 seconds to form a homogenous blend. CURENE® 442 MOCA (768 grams) was melted at a temperature of about 212°–228° F. and high shear blended with the urethane/polyvinyl pyrrolidone mixture and poured into a mold during the low viscosity window, namely before about 2.5 minutes had elapsed. The resulting mixture was gelled, heated for about six hours at about 225° F., cooled, and cut into polishing pads in a manner similar to that set forth in Example 1.

EXAMPLE 5

A polymeric matrix was prepared by mixing 3625 grams of ADIPRENE™ L-213 urethane with 930 grams of CURENE® 442 MOCA. During the low viscosity window 65 grams of white, free-flowing hydroxyethylcellulose (commercially available from Union Carbide Chemicals and Plastics Corp. of Danbury, Conn.) was blended with the urethane mixture. The hydroxyethylcellulose is insoluble in organic solvents but dissolves in hot or cold water. The composite blend was then processed in a manner similar to that set forth in Example 1.

In alternative embodiments best shown in FIGS. 5–9, the work surface 18 of the article 10 may further include a mini or macro pattern or texture 26 which includes recessed and/or elevated portions or artifacts 28. The texture 26 may be formed upon at least a portion of the work surface 18 by mechanical texturizing methods, such as machining, embossing, turning, grinding, replicating and lasering the work surface 18. One of ordinary skill in the art would understand that the texture 26 may be formed by a variety of other mechanical work or chemical methods, such as etching, for example.

By texturizing the work surface 18, up to 50% or more surface area may be exposed to facilitate removal of dross during polishing. In addition, texturing of the work surface 18 enhances the polishing action by exposing a greater number of microelements 16' to the working environment. The texture 26 may be formed in a variety of patterns, contours, grooves, spirals, radials, dots, or any other shape as desired. Texturing the work surface 18 of the pad 12 offers a series of hardness variations on the microscale. For example, the artifacts 28 may be shaped to form cones or blades having a harder core and a softer outer surface in addition to the harder subsurface 24.

Preferably, the artifacts 28 are spaced apart between about 0.1 mm to about 10 mm and have a depth between about 1 mm and about 10 mm. Generally, it is preferred that the artifacts 28 have a length in a first dimension less than about 1000 times a mean diameter of a polymeric microelement 16. It is also preferred that the artifacts 28 have a depth less about 2000 times a mean diameter of a polymeric microelement 16.

Figure 6:
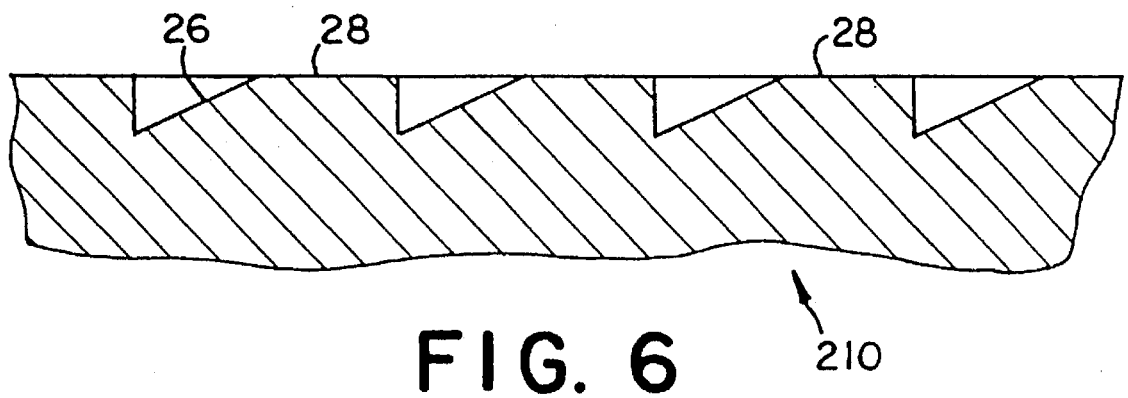
FIG. 6 is an enlarged partial cross-sectional view of the pad of FIG. 5, taken along line 6—6.

As best shown in FIGS. 5 and 6, the work surface 18 may include a minitexture including artifacts 28 having a width between about 1000 μ and 5 mm. The minitexture shown in FIGS. 5 and 6 is a concentric circular pattern, although one of ordinary skill in the art would understand that the minitexture may be a spiral or other pattern, including those discussed above.

Figure 8:
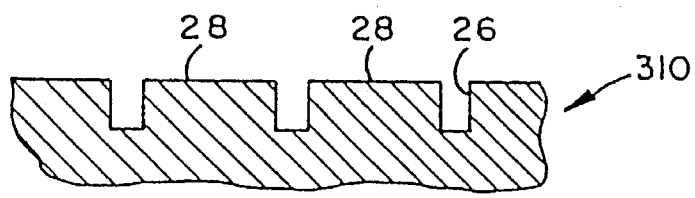
FIG. 8 is an enlarged partial cross-sectional view of the pad of FIG. 7, taken along line 8—8.

As best shown in FIGS. 7 and 8, the work surface 18 may include a macrotexture including artifacts 28, each artifact 28 having a width greater than about 5 mm. As shown in FIGS. 7 and 8, the minitexture is a generally square grid, although one of ordinary skill in the art would understand that the minitexture may be formed in any pattern, including those discussed above, as desired.

The macrotexture and minitexture may be formed by typical machining methods, such as embossing, turning, grinding, replicating and lasering and a variety of other methods well known to those of ordinary skill in the art.

EXAMPLE 6

Using a standard lathe and a single point tool, the work surfaces 18 shown in FIGS. 5–8 were cut by superimposing circular and square grid patterns, respectively, on the work surface 18 which was vacuum mounted to the lathe or milling machine's rotating plate. A conventional horizontal milling machine with ganged cutting tools or custom cutting combs with regularly spaced serrated teeth was used to machine the work surface 18 in the desired pattern.

As best shown in FIG. 5, the annular minitexture was machined into the polishing pad to form grooves having 1.397 mm (0.055") pitch, each with a depth of 0.356 mm (0.014"). The groove form is buttress thread with a 60 degree ramp towards the pad's inside diameter, as shown in FIG. 6.

The square grid macrotexture 28 shown in FIGS. 7 and 8 was machined on a horizontal milling machine to produce squares having grooves 0.813 mm (0.032") wide and 0.635 mm (0.025") deep defining 6.35 mm (0.25") artifacts 28.

Figure 9:
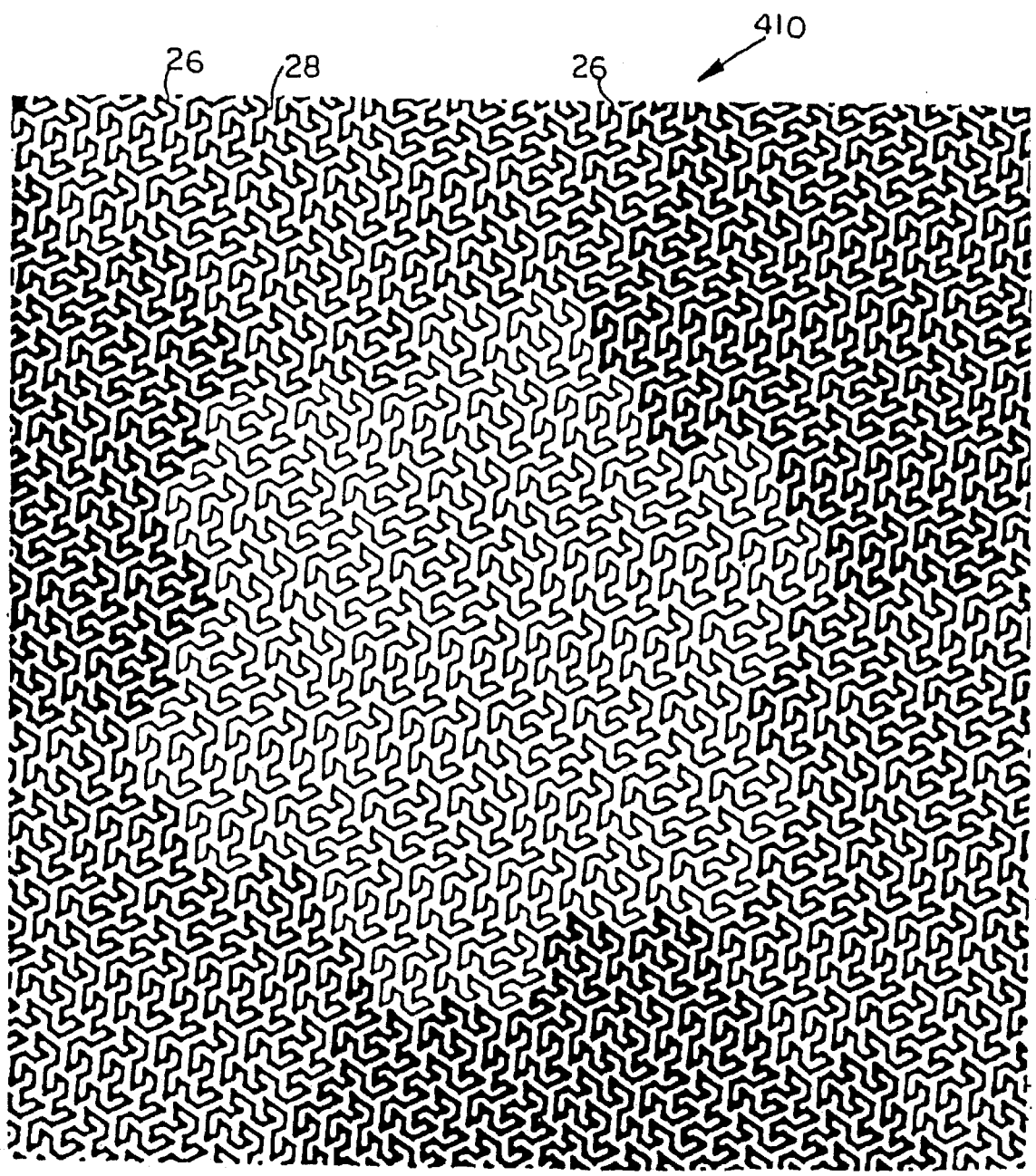
FIG. 9 is a alternative embodiment of a fractal patterned minitexturized pad according to the present invention.

As best shown in FIG. 9, the work surface 18 may also include a minitexture including artifacts 28 having a width between about 1000 μm and 5 mm produced by use of a carbon dioxide laser. Preferably, the microtexture is produced in the shape of a fractal pattern on the work surface 18. As herein defined "fractal pattern" means a repeating pattern which has repeating artifacts in which the artifacts are different from each other. The fractal pattern may be generated by deterministic or non-deterministic mathematical formulas, such as the Gosper Island variant of the Koch Island & Lake fractal pattern ("Gosper pattern") (shown in FIG. 9). Suitable fractal models include the round, spherical and swiss-cheese tremas, although one of ordinary skill in the art would understand that other suitable fractal patterns may be used in accordance with the present invention, as desired. Preferably, the fractal pattern is chaotic or random.

EXAMPLE 7

As best shown in FIG. 9, grooves or minitextures were machined into a polishing pad 12 using a typical carbon dioxide laser with a continuous wave output of 100 watts. The power rating, output and beam focus were selected to cut a groove with a depth of about 0.458 mm (0.018") and having a width of less than about 0.127 mm (0.005"). The minitexture was the Gosper Island variation of the Koch Island & Lake fractal pattern discussed above. The fractal pattern image was read and programmed electronically into a conventional computer numerical controller, which controlled movement of the laser beam to form the fractal pattern on the work surface 18 of the pad 12. An adhesive mask was used to eliminate vapor trails from accumulating on the pad. The adhesive mask also reduced the attendant minor fusing on the edges of the grooves.

Alternatively, or additionally, isolated "mesa" patterns may be embossed onto the work surface 18 to form a minitexture. For example, a conventional 30 ton press machine may be used to apply about 25 tons of pressure to emboss a minitexture onto the work surface 18 of a pad 12. Heat may be applied to enhance the embossing effect.

The method according to the present invention of planarizing a surface of a semiconductor device utilizing an article 10 et seq. according to the present invention will now be described generally.

With reference to FIGS. 1–3, the method generally comprises the initial step of providing an article 10 or 110 comprising a polymeric matrix 14. The polymeric matrix 14 is impregnated with a plurality of polymeric microelements 16. The details of providing the polymeric matrix 14 and impregnating the matrix 14 with the microelements 16 are discussed above and further discussion thereof is not believed to be necessary nor is it limiting. Preferably, the work surface 18 of the article 10 or 110 is textured to form artifacts 28 to provide an enlarged work surface area and expose microelements 16 to the working environment which would not normally be exposed if the work surface 18 were generally flat.

The method further comprises the step of contacting at least a portion of the work surface 18 of the article 10 or 110 with the working environment such that the polymeric microelements 16' at the work surface 18 of the article 10 or 110 are less rigid than the polymeric microelements 16 located in the adjacent subsurface 24. For example, a portion of a shell 20 of at least a portion of the polymeric microelements 16 located proximate the work surface 18 may be opened by at least one of skiving, abrading, cutting and puncturing a portion of the shell 20 or by chemically altering or softening a portion of the shell 20 to render a portion of the polymeric microelements 16' of the work surface 18 less rigid than the microelements 16 located in the subsurface 24. Details as to how the polymeric microelements 16' at the work surface 18 may be made less rigid are discussed above and further discussion thereof is not believed to be necessary nor limiting.

The method further comprises the step of contacting the surface (not shown) of the semiconductor device (also not shown) with at least a portion of the work surface 18 of the article such that the surface of the semiconductor device is sufficiently planarized. The article 10 or polishing pad 12 may be attached to a conventional polishing machine such as are well known to those of ordinary skill in the art. Preferably, the work surface 18 is oriented generally parallel to the surface of the semiconductor device to be planarized and may be moved in linear or circular sliding contact, for example, to planarize or abrade the surface of the semiconductor device, as desired.

As the work surface 18 of the pad 12 is abraded by sliding contact with the surface of the semiconductor device, portions of the subsurface 24 are exposed and microelements 16 in the subsurface 24 are abraded or chemically altered or softened to form a new work surface 18 having similar physical properties to the previously abraded work surface. Therefore, the work surface 18 in contact with the surface of the semiconductor device is essentially continuously regenerated to provide a consistent planarizing or polishing action upon the surface of the semiconductor device.

A method according to the present invention of regenerating the work surface 18 of an article according to the present invention will now be described generally.

Referring now to FIG. 11, the method generally comprises the initial steps of providing an article 410 or pad 12 comprising a polymeric matrix 14 and impregnating the matrix 14 with a plurality of polymeric microelements 16. The details of forming the article 10 are discussed at length above and further discussion thereof is not believed to be necessary nor limiting.

The method further comprises the step of opening at least a portion of a shell 20 of at least a portion of the polymeric microelements 16 located proximate to the work surface 18 such that the open microelements 16' are less rigid than the microelements 16 in the subsurface 24. The step of opening the polymeric microelements may include at least one of skiving, abrading, cutting and puncturing a portion of each of the shells 20 of the microelements 16. As best shown in FIG. 11, the shells 20 of the microelements 16' at the work surface 18 may be punctured by a combined pommelgation and perforation device 30, a portion of which is shown in cross-section in FIG. 11. The device 30 may be formed from any material having sufficient rigidity to puncture the work surface 18 and microelements 16, such as stainless steel, aluminum and other metals, for example. The device 30 includes a plurality of sharp implements or needles 32 for puncturing at least a portion of a shells 20 of polymeric microelements 16 located proximate the work surface 18.

In addition to the needles 32, the device 30 includes at least one, and preferably a plurality of pads 34 for preventing the needles 23 from puncturing the work surface 18 too deeply. Preferably, the needles 32 puncture the work surface 18 to a depth of about 60 μm, although one of ordinary skill in the art would understand that the puncturing depth of the device 30 may any depth greater or less than 60 μm, as desired. For example, longer needles 32 could be used to puncture the work surface 18 to a depth greater than 60 μm.

One of ordinary skill in the art would understand that the microelements 16 may be opened or the pad 12 may be punctured one or more times, as needed.

In an alternative embodiment, at least a portion of the shells 20 of polymeric microelements 16 located proximate the work surface 18 may be chemically altered or softened by the work environment such that the partially altered polymeric microelements 16 at the work surface 18 are less rigid than the polymeric microelements 16 embedded in the subsurface 24. For example, the polymeric microelements 16 may be formed from water soluble cellulose ethers comprising methylcellulose or hydroxypropylmethylcellulose which at least partially dissolve when contacted with a working environment comprising water.

From the foregoing description, it can be seen that the present invention comprises articles of manufacture for altering a surface of a workpiece, such as a semiconductor device, and methods for decreasing the effective rigidity of a polymeric microelement located at a portion of a work surface of such an article, regenerating the work surface of such an article, and planarizing a surface of a semiconductor device utilizing such an article. The present articles may be used to more rapidly and evenly polish or planarize a substrate or other workpiece.

It will be appreciated by those skilled in the art that other changes could be made to the embodiments described above without departing from the broad inventive concept thereof. It should be understood, therefore, that this invention is not limited to the particular embodiments disclosed, but it is intended to cover all modifications which are within the spirit and scope of the invention, as defined by the appended claims.

We claim:

1. A polishing pad for polishing or planarizing a surface of an electronic substrate, said pad comprising a polymeric matrix impregnated with a plurality of hollow, flexible, organic polymeric microelements, said pad having a work surface and a subsurface proximate to said work surface, one portion of said polymeric microelements being at said work surface and exposed to a working environment including a polishing slurry, another portion of said polymeric microelements being embedded within said subsurface of said pad that is not exposed to said working environment, said work surface of said pad is relatively softer than said subsurface as a result of said exposure of said one portion of said polymeric microelements at said work surface to said working environment, and said subsurface becomes said relatively softer work surface during wear of said pad when said polymeric microelements are exposed to said working environment.

2. A pad according to claim 1, wherein said polymeric microelements are substantially uniformly distributed throughout said polymeric matrix.

3. A pad according to claim 1, wherein said polymeric matrix comprises a urethane polymer.

4. A pad according to claim 1, wherein at least a portion of said polymeric microelements located at said work surface soften upon exposure to said working environment.

5. A pad according to claim 1, wherein at least a portion of said polymeric microelements located at said work surface swell upon exposure to said working environment.

6. A pad according to claim 1, wherein at least some of said polymeric microelements contain a plurality of void spaces therein.

7. A pad according to claim 1, wherein said hollow polymeric microelements contain a gas at a pressure greater than atmospheric pressure.

8. A pad according to claim 1, wherein said polymeric microelements have a mean diameter less than about 150 μm.

9. A pad according to claim 8, wherein said mean diameter of said polymeric microelements is about 10 μm.

10. A pad according to claim 1, wherein said polymeric microelements are spaced apart by about 1 μm to about 100 μm.

11. A pad according to claim 1, wherein at least some of said polymeric microelements are generally spherical in shape.

12. A pad according to claim 1, wherein at least some of said polymeric microelements have permeable shells so that said hollow microelements may be rendered open to said working environment.

13. An article according to claim 1, wherein said polymeric microelements comprise at least one material selected from the group consisting of polyvinyl alcohol, pectin, polyvinyl pyrrolidone, hydroxyethylcellulose, methylcellulose, hydropropylmethylcellulose, carboxymethylcellulose, hydroxypropylcellulose, polyacrylic acids, polyacrylamide, polyethylene glycol, polyhydroxyetheracrylite, starch, maleic acid copolymer, polyethylene oxide, and polyurethane.

14. A pad according to claim 1, wherein said work surface is about 5 μm to about 60 μm thick.

15. A pad according to claim 1, wherein said work surface further comprises a microtexture integral with said pad, said microtexture including an artifact having a width less than about 1000 μm.

16. A pad according to claim 1, wherein said work surface further comprises a minitexture integral with said pad, said minitexture including an artifact having a width of about 1000 μm to about 5 mm.

17. A pad according to claim 1, wherein said work surface further comprises a macrotexture integral with said pad, said macrotexture including an artifact having a width greater than about 5 mm.

18. A pad according to claim 1, wherein said work surface further comprises a texture integral with said pad, said texture including a plurality of artifacts, each of said artifacts being spaced apart of about 0.1 mm to about 10 mm and having a depth of about 1 mm to about 10 mm.

19. A pad according to claim 1, wherein said work surface further comprises a texture integral with said pad, said texture including an artifact having a length in a first dimension less than about 1000 times a mean diameter of said polymeric microelements.

20. A pad according to claim 1, wherein said work surface further comprises a texture integral with said pad, said texture including an artifact having a depth less than about 2000 times a mean diameter of said polymeric microelements.

21. A polishing pad for polishing or planarizing a surface of an electronic substrate, said pad comprising a polymeric matrix impregnated with a plurality of hollow, flexible, organic polymeric microelements, said pad having a texturized work surface and a subsurface proximate to said work surface, one portion of said polymeric microelements being at said work surface and exposed to a working environment including a polishing slurry, another portion of said polymeric microelements being embedded within said subsurface of said pad that is not exposed to said working environment, said texturized work surface of said pad is relatively softer than said subsurface as a result of said exposure of said one portion of said polymeric microelements at said work surface to said working environment, and said subsurface becomes said relatively softer work surface during wear of said pad when said polymeric microelements are exposed to said working environment.

\* \* \* \* \*